United States Patent
Batada et al.

(10) Patent No.: US 9,374,799 B2
(45) Date of Patent: Jun. 21, 2016

(54) MOBILE DEVICE LOCATING USING LONG TERM EVOLUTION SIGNALS

(71) Applicant: Cellco Partnership, Basking Ridge, NJ (US)

(72) Inventors: Asif N. Batada, Marietta, GA (US); Ashfaq Kamal, White Plains, NY (US); Andrew E. Youtz, Princeton, NJ (US); Brigitte Bastaldo-Tsampalis, Bridgewater, NJ (US); Yuk Li, Morganville, NJ (US); Manuel E. Caceres, Basking Ridge, NJ (US); Praveen Venkataramu, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 240 days.

(21) Appl. No.: 14/139,084

(22) Filed: Dec. 23, 2013

(65) Prior Publication Data

US 2015/0181549 A1    Jun. 25, 2015

(51) Int. Cl.
*H04W 24/00* (2009.01)
*H04W 64/00* (2009.01)
*H04W 4/04* (2009.01)

(52) U.S. Cl.
CPC ............... *H04W 64/00* (2013.01); *H04W 4/04* (2013.01)

(58) Field of Classification Search
CPC .......... H04W 4/00; H04W 8/02; H04W 8/08; H04W 8/10; H04W 8/14; H04W 8/16; H04W 8/18; H04W 8/20; H04W 48/18; H04W 64/00; H04W 4/04; H04W 36/36; H04W 60/00; H04W 60/04; H04W 74/00; H04W 4/043; H04W 68/00; H04W 76/06; H04W 88/06; H04W 4/02; G01C 21/00; G01S 19/05; G01S 19/28; G01S 5/14; G01S 19/48; G01S 19/06; G01S 19/252; G01S 19/29

See application file for complete search history.

(56) References Cited

U.S. PATENT DOCUMENTS

| 7,130,646 | B2 * | 10/2006 | Wang | G01S 5/14 455/404.2 |
| 7,298,327 | B2 * | 11/2007 | Dupray | G01S 1/026 342/451 |
| 7,315,735 | B2 * | 1/2008 | Graham | H04L 12/66 370/310 |
| 7,336,961 | B1 * | 2/2008 | Ngan | H04W 64/00 455/140 |
| 7,471,243 | B2 * | 12/2008 | Roslak | G01S 5/0252 342/463 |
| 8,072,381 | B1 * | 12/2011 | Ziegler | G01S 5/0236 342/386 |

(Continued)

*Primary Examiner* — Mahendra Patel

(57) ABSTRACT

The described examples provide a system and methods for identifying a location of a mobile device within an indoor venue using cellular communication signals obtained while the mobile device is within the indoor venue. An array of antennas arranged within the indoor venue detects cellular communication signals transmitted by the mobile device. The detected cellular communication signals have detectable and measurable signal parameters that allow the location of the mobile device within the indoor venue and an identifier of the mobile device to be determined. The determined identifier of the mobile device may also be used to identify the mobile device subscriber. The mobile device indoor location information may be used to update an anonymized subscriber profile associated with the mobile device subscriber.

20 Claims, 4 Drawing Sheets

(56) References Cited

U.S. PATENT DOCUMENTS

| | | | | |
|---|---|---|---|---|
| 8,082,096 B2* | 12/2011 | Dupray | ............... | G01S 5/0018 701/465 |
| 2005/0143091 A1* | 6/2005 | Shapira | ............... | H04W 64/00 455/456.1 |
| 2006/0251008 A1* | 11/2006 | Wu | ............... | H04W 88/08 370/328 |
| 2008/0043771 A1* | 2/2008 | Cho | ............... | H04W 74/002 370/431 |
| 2009/0176507 A1* | 7/2009 | Wu | ............... | G01S 5/04 455/456.2 |
| 2009/0191891 A1* | 7/2009 | Ma | ............... | G01S 13/878 455/456.1 |
| 2011/0124347 A1* | 5/2011 | Chen | ............... | H04W 64/00 455/456.1 |
| 2011/0171973 A1* | 7/2011 | Beck | ............... | G01S 5/0221 455/456.2 |
| 2012/0143495 A1* | 6/2012 | Dantu | ............... | G01C 21/206 701/428 |
| 2012/0281565 A1* | 11/2012 | Sauer | ............... | H04W 88/085 370/252 |
| 2013/0281084 A1 | 10/2013 | Batada et al. | | |
| 2015/0091757 A1* | 4/2015 | Shaw | ............... | G01S 5/02 342/385 |

* cited by examiner

100

200

300

MOBILE DEVICE LOCATING USING LONG TERM EVOLUTION SIGNALS

BACKGROUND

The capability to accurately determine the location of a cellular-enabled mobile device is well known. For example, triangulation, trilateration and other techniques of locating a mobile device in a wireless network are well known and frequently used for locating mobile devices. Most mobile devices today also have Global Positioning System (GPS) capabilities for location determinations. The determined location of the mobile device is frequently correlated to other data such as known store locations, event locations, roadways for traffic flow indications, and other information related to the determined location. The location information and correlated information can be used by entities to provide advertising, indicate alternative traffic routes, identify destinations that a user may be searching for, such as a gas station, a parking garage, a restaurant, a library and the like.

Also, Wi-Fi networks can be used both indoors and outdoors to determine a location of mobile device. For example, some service providers provide free Wi-Fi hotspots at different entities, such as coffee shops or fast food restaurants; and a mobile device can use a Wi-Fi hotspot at such a location to access a data network. The service provider can identify the mobile device, and the access point that the mobile device used to gain access to the network. Since the service provider knows the location of the access point, the service provider can also infer the location of the mobile device. In addition, as the mobile device is carried through an area, for example, a city, the mobile device may detect the Wi-Fi access points as it moves through the area. Identifiers, such as street addresses, of the access points may be forwarded by the mobile device via the cellular network to a service provider. Using the information obtained regarding nearby Wi-Fi access points as well as information obtained from the cellular network, the coarse location of a mobile device (e.g. at the corner of I street and $13^{th}$ street) can be obtained and tracked with some precision.

However, when the mobile device enters an indoor venue, such as a shopping mall or large store, GPS may be unavailable and the cellular signals are often attenuated and not reliable. As a result, the precision of the location services decreases. Without implementing a sophisticated wireless access system, any Wi-Fi within the indoor venue is also of limited value in determining a specific location of the mobile device within the indoor venue. Also, often, a user must make the appropriate settings on their mobile device to join a Wi-Fi network. Furthermore, the Wi-Fi system may not obtain location information related to the mobile device, and may also not forward the location information to a service provider.

In addition, an application executing on a mobile device, such as a smartphone or tablet, is often used to assist in determining the location of the mobile device or is otherwise using the determined position of the mobile device to provide a service. The service may be a game, a concierge-type service, such as locating a restaurant, a shopping information service, such as a retailer website, local news or some other location-based service. When associated with a specific venue, the application also likely presents advertising related to features, such as retailers, kiosks, special events, discounts and the like, in the indoor venue.

Often times, the general location of the mobile device within the indoor venue can not be accurately determined with precision due to the unreliable signals provided to the cellular network. In other words, the location data collected through the existing cellular infrastructure does not offer the granularity and/or the accuracy required to be effectively utilized for providing targeted advertising or location services with respect to an indoor venue. Alternatively, the requirement to have an application executing on the mobile device requires a user to remember to launch the application or have the mobile device set to detect and use Wi-Fi whenever available. If a user chooses not to enable Wi-Fi on their mobile device, the application may be unable to provide the advertising or location-service information.

Furthermore, the obtained location information may not be associated with a specific subscriber of the mobile device. So even if location information is obtained based on the access points to which the mobile device connects, the location information only provides general information about the mobile device location and little or no information regarding the subscriber, or other user of the mobile device. As a result targeted advertising may not be effectively implemented and the effects of the advertising will be hard to quantify.

Hence a need exists for a system that provides accurate indoor location services as a mobile device user enters an indoor venue without the need of an application executing on the mobile device or otherwise require a particular setting on the mobile device to be set, and that associates the location of the mobile device with the mobile device subscriber.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
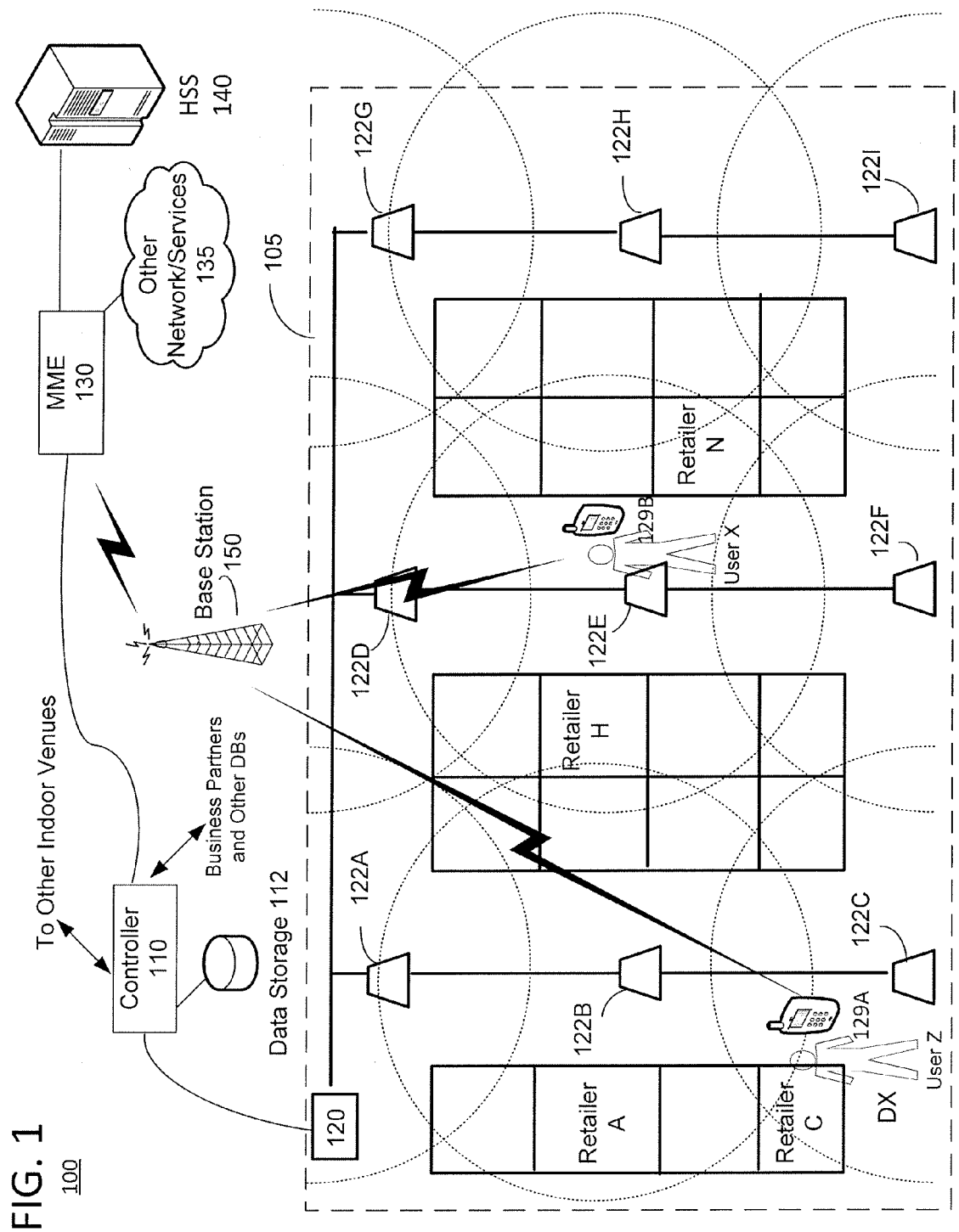
FIG. 1 is a high-level functional block diagram of an example of a system of networks/devices that provide various communications for mobile stations and support an example of the location and profiling service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples of systems and methods disclosed herein relate to determining a location of a mobile device in an indoor venue utilizing cellular signals output by the mobile device. The mobile device cellular signals are captured by antennas positioned within the indoor venue to support processing of the signals so as to effectively locate a mobile device and further identify a subscriber associated with the mobile device. In addition, the location information may be used for updating a subscriber profile associated with the mobile device. In general, the disclosed examples provide systems and methods that enable a service provider to passively identify and track locations of a mobile device within an indoor area thereby enabling the service provider to offer indoor location-based products and services related to the indoor venue.

For example, an array of antennas are arranged within an indoor venue, such as a shopping mall, tradeshow, department store, home improvement store and the like, to monitor cellular network signals and messages from a mobile device within the venue. Signals of the indoor array of antennas do not suffer as much from the signal attenuation and degradation experienced by signals from base stations located distal from the venue. An estimated location of the mobile device to within a few meters of an actual location may be determined based on additional dimensional attributes (e.g. orthogonal displacement in the horizontal and vertical axis) by placing antennas in the appropriate locations within the indoor venue. By using, for example, signal strength measurements from each antenna in the array of indoor antennas that receives a mobile device signal, the system is able to determine the location of the mobile device using known position determination techniques from the monitored cellular network signals. As the mobile device user moves around the venue, different combinations of antennas assist with location determination (e.g. trilateration, extrapolation or triangulation), thereby accurately tracking the movement of the mobile device.

But knowing the location of mobile devices only provides limited data, such as a number of people that travel a particular path in the indoor venue, or stop at a particular location within the indoor venue. The indoor venue location information may be cross-referenced to a layout diagram of the indoor venue to identify specific features within the indoor venue that were visited by a mobile device user. Without being able to associate the mobile device to the mobile device subscriber or at least some permanent identifier, the location data has limited use because there is no way to determine specific information about the subscriber, such as age range, possible gender or other subscriber-specific demographic or marketing-related information.

The disclosed examples address this additional problem. In addition to accurately determining the location of the mobile device in the indoor venue using the monitored cellular network signals, the permanent identifier of the mobile device is also obtained. The mobile device permanent identifier may be cross-referenced to a mobile device subscriber account associated with mobile device. It should be noted that a single mobile device subscriber may have multiple mobile devices associated with the subscriber. For example, a family may have multiple mobile devices in the name of a single mobile device subscriber. The location determination examples, as described, do not differentiate between the different mobile device users. For example, a husband and wife may each have a mobile phone, and both phones are under an account of a single mobile device subscriber. When entering the indoor venue, the location determinations of the respective location of each of the mobile devices, but the identity assigned to each of the mobile devices will be the same since both mobile phones are under the same subscriber accounts. Additional information, either provided by the husband or wife, or by using data mining techniques, may need obtained to construct separate profiles for the husband and for the wife. For example, the additional user information may be provided by a particular login sequence associated with a particular user. In which case, the husband's login sequence may be different than his wife's login sequence. Although the identity of the mobile device user may not be specifically known, tracking movement over time through some number of known venues may allow the system operator to classify an otherwise anonymous user and build a profile based on behavior, e.g. by noting which stores in a venue a user visits, by noting one user often shops when not accompanied by other devices on an account, whereas another user only frequents the venue when at least one other device on the subscriber's account is present.

The disclosed examples monitor the cellular network signals from a mobile device for particular information without actively sending signals over the air to the mobile device. Generally, when a mobile device requests to communicate in a cellular network, the mobile device is assigned a particular time slot and frequency in which to communicate by a higher-level control device. The mobile device communicates at the assigned time slot and frequency with the higher-level control device and includes in the transmitted cellular network signals a temporary mobile device identifier. The temporary mobile device identifier is used as a security measure to prevent the interception of the permanent identifier of the mobile device by persons who may want to use the information for fraudulent purposes, such as generating a clone of the mobile device. There are times, however, that the permanent identifier is transmitted in the cellular message, but this is done very infrequently as to make interception of a signal containing the permanent identifier impractical.

The disclosed examples of a system may therefore monitor the time slots and frequency slots allocated to individual mobile devices for cellular network communication by a communication managing device, such as a mobile management entity (MME). Since only one mobile device is allocated to a particular time slot and frequency, the specific time slot and frequency slot can used by the system to roughly identify the mobile device. The system communicates with the communication managing device to obtain more detailed information related to the particular time slot and frequency slot at which the system detected the mobile device. The communication managing device returns the more detailed information, which may be a permanent identifier of the mobile device. The system using the mobile device identifier may further query the communication managing device or other systems for additional information (e.g. subscriber profile) related to the mobile device permanent identifier. In an example, the system generates a query to the communication managing device for additional information related to the mobile device. The communication managing device accesses a database that contains a mapping of the temporary mobile device identifier to the permanent mobile device identifier maintained by the cellular network provider in a data storage, and obtains a permanent identifier of the mobile device. Using the permanent mobile device identifier, a subscriber profile may be accessed from, or created in, a database that may be associated with obtained indoor venue location information. Of course, other information such as subscriber preferences or other location based information related to the subscriber may be included in the subscriber profile. The subscriber (or user) profile is an anonymized profile, meaning no personal data of the subscriber is maintained unless the subscriber chooses to opt into a service, such as receiving discounts and other offers from retailers, that uses subscriber-specific (e.g. personal) data in the subscriber (user) profile. At least for users who opt-in, the subscriber (user) profile may be updated with data obtained from other sources, such as third-party business partners, retailers or the like, other than the cellular network provider. The database of subscriber profiles may be used by the cellular network provider to determine new services to offer to subscribers, provided to business partners of the cellular network provider, or used to present advertising based on the anonymized profile information. In cases in which a subscriber has multiple mobile devices under a single subscriber account, the subscriber profile may include sub-profiles (i.e. user profiles), each of which corresponds to a respective mobile device of the multiple mobile devices in the subscriber account. In the example of the husband and wife introduced above, the wife may be the subscriber, and the husband may have a user sub-profile under the wife's subscriber profile. If the husband and wife opt-in, they allow the system to link their identities to identities of the respective mobile devices that they use; and they may allow the system operator to mine data from other sources to enhance their profiles.

Reference now is made in detail to the examples illustrated in the accompanying drawings and discussed below. FIG. 1 is a high-level functional block diagram of an example of a system of networks/devices that provides various communications for mobile stations and supports an example of the location and profiling service. The system 100 in our example includes a venue system controller 110, an array controller 120 communicatively coupled to an array of antennas 122A-I located inside an indoor venue 105, a cellular network that includes both a cellular communication device (i.e. a base station such as an eNodeB) 150 and a cellular communication management device (i.e. a mobility management entity (MME)) 130, other networks/services 135 (e.g., Internet, public switched telephone network, affinity program databases, data analytics services, and the like), and a home subscriber server (HSS) 140. The base station 150 is a principal node in the illustrated cellular network because the base station 150 controls the amount of network resources (e.g. telephone, data or both) that are provided to a respective mobile device (i.e. 129A) in the indoor venue 105 as well as any mobile devices (not shown) outside the indoor venue 105.

The system 100 components may have various configurations. For example, the base station 150 may include antennas, transceivers, a processing system and an interface that perform various functions for providing cellular communications to the mobile devices. The base station 150 facilitates the establishment a communication session between mobile devices by forwarding control signals to the MME 130. Similarly, the MME 130 may include a processing system and an interface that perform various functions for providing cellular communications to mobile devices via base stations in cells managed by the MME 130. The MME 130 may also activate and deactivate bearers (a bearer is a logical channel having particular quality of service requirements), authenticate a mobile device user via communications with the HSS 140, and may interface with non-LTE radio access networks.

The HSS 140 is a network control point platform that stores records, such as device records, subscriber account or customer-related service profile records associated with mobile devices, for authentication, and for authorization to access communication resources/services of the mobile network. A HSS profile record for a mobile device may include relevant identification information, subscription information and possibly information about the network location of the device (e.g. attached to a particular base station and/or MME) and/or IP (Internet Protocol) address assignment information.

The antennas 122A-I in the array of antennas of the system 100 may include one or more directional and/or omnidirectional antennas. Each of the antennas 122A-I may have a transceiver and circuitry associated with a radio frequency receiver for receiving signals from within the indoor venue 105 and a communication interface for transmitting the received signals to the array controller 120. Links between the antennas and the array controller 120 may be wired or wireless. The array controller 120 may, for example, include, a processor for performing signal processing functions, such as signal strength measurements, and position determinations, based on the results of the signal processing. In addition, the array controller 120 may include a transceiver and circuitry associated with the receiver for receiving the signals from the respective antennas 122A-I and a network communication interface for transmitting signal processing results and/or the signals received from the respective antennas 122A-I to other components of the system 100. The antennas 122A-I may include circuitry for noise processing, such as a noise preamplifier and noise cancelling, and for adding signal gain. The antennas 122A-I may be configured to receive signals in a single or multiple frequency bands used by mobile network operators (i.e. cellular communication carriers). In addition, the antennas 122A-I, the array controller 120, or the venue system controller 110 may be configured with circuitry for processing time division duplex (TDD) and/or frequency division duplex (FDD) signals in the respective single frequency or multiple frequencies.

Inside the indoor venue 105 may be any number of mobile devices, such as mobile devices 129A and 129B of User Z and User X, respectively. Each mobile device has a permanent identifier, such as a mobile directory number (MDN), International mobile Subscriber Identity (IMSI), or an Integrated Circuit Card Identifier (ICCID) of a Subscriber Identity Module (SIM) card of the mobile device. The respective mobile devices may have different capabilities (e.g., one device may be a tablet device and the other is a smartphone) or similar capabilities (e.g. both are smartphones).

In an example, the base station 150, MME 130 and HSS 140 are cellular network devices operating according to the Long Term Evolution (LTE) standard. The base station 150 receives the LTE cellular network signals from the mobile devices 129A and 129B and is controlled (e.g. by elements such as the MME 130 and/or the HSS 140) to provide cellular voice and data service to the respective Users Z and X. Each of the base station 150, MME 130 and HSS 140 execute known control processes in response to receiving cellular communication signals from mobile devices, such as the mobile devices 129A and 129B. Through known attachment and packet transfer procedures, the mobile devices 129A and 129B are able to register to the LTE network by interacting with the MME 130 through a base station 150. For example, the mobile devices 129A and 129B may also be authenticated by the network. For example, within the network (not shown), the MME 130 may communicate with the HSS 140, which is a central database in the network containing user-related and subscription-related information. Particularly, a subscriber profile in the HSS 140 may be used to authenticate a mobile device user and to authorize services such as mobility management, call and session establishment support, and the like. Once registered, the mobile devices 129A and 129E are able to obtain voice and data communications through the base station 150, MME 130 and/or the other network 135. During attachment, the MME 130 may create a mobile device instance that is assigned a temporary identifier (i.e. a S-TMSI) of the mobile device and that contains subscriber information obtained from the HSS 140. A mobile device instance is a data record related to the mobile device connected to the MME 130. The particular mobile device instance is maintained by the MME 130 for the duration of the time that the particular mobile device is controlled by the MME 130. For example, the base station 150 may receive information from a mobile device that is forwarded to the MME 130 to authenticate the mobile device to the network.

The MME 130 may obtain information from the HSS 140 as part of the authentication or other processes. For example, the HSS 140 provides data upon request to enable session control elements (not separately shown) to control the flow of sessions through the 4G LTE network (not shown) for the mobile devices 129A or 129B, e.g. to authenticate a particular mobile device and to indicate that the mobile device is or is not authorized to utilize a particular network service.

The MME 130 is able to authenticate the mobile device (e.g. 129A) because the MME 130 has access, via, for example, the HSS 140, to data that includes a permanent identifier (i.e. IMSI) of the respective mobile device. The base station 150 provides data related to the IMSI, such as all or part of the IMSI or information related to the mobile device (e.g. type and/or capabilities, such as whether text and data enabled) that is stored in the subscriber identity module (SIM) card in LTE enabled mobile devices, and, in 3G mobile devices, the IMSI is stored directly in the mobile device memory. As mentioned above, the IMSI is transmitted as infrequently as possible for security purposes, so the temporary identifier S-TMSI is generally transmitted during cellular communications. However, the MME 130 has a data storage that maps the S-TMSI to the permanent IMSI. The data storage may be used, for example, for determining permissions related to services that are available to the particular mobile device. Furthermore, the MME 130 maintains the instance of the mobile device, for example, mobile device 129A, during idle periods when the mobile device 130 is not actively requesting or receiving services from the network (i.e. the MME 130) to minimize the number of times the MME 130 has to access the HSS 140, which also minimizes the latency in obtaining network resources for the respective mobile device. As for the other network 135, the MME 130 couples to the other network 135 to provide data services, telephone service and/or other services to the respective mobile devices in indoor venue 105.

In the indoor venue 105, the GPS capabilities of the mobile devices 129A and 129B are considered unreliable for location estimation because the GPS signals suffer degradation and/or attenuation when traveling through walls and may experience an "urban canyon" effect that leads to inaccuracies in location estimation and/or to an inability to obtain a location fix. The cellular network signals exchanged by the base station 150 and the mobile devices in the indoor venue 105 while sufficient for voice and data communications may also be unreliable for location estimation by systems external to the indoor venue for similar reasons.

The array controller 120 is coupled to each of the plurality of antennas 122A-I and collects all of the signals received by each of the respective antennas 122A-1. Each of the antennas 122A-I is configured to receive signals in the known cellular communication frequency bands. For example, mobile network operator (i.e. cellular carrier) signals that are transmitted in a single frequency or multiple frequency may be received. In addition, the array controller 120 may be configured to process signals that are time division duplexed (TDD) or frequency division duplexed (FDD). The array controller 120 may include a processor and a memory. The array controller 120 processor, in some example, is configured to receive and process cellular network signals detected by each of the respective antennas 122A-I. The array controller 120 processor, for example, is configured with appropriate software, hardware and/or firmware to process the signals received from the respective antennas 122A-I to determine or measure signal parameters. For example, each antenna, such as antenna 122A, may merely forward received signals to the array controller 120 for measurement of signal parameters, such as signal strength. The array controller 120 may be configured to execute location determination algorithms to determine a mobile device location based on the measured signal parameters. Alternatively, each antenna 122A-I in the array of antennas may perform timing/signal strength measurements, for example, on an acknowledgment (ACK) signal transmitted by a mobile device, in order to estimate a current location of the mobile device. For example, antenna 122C of the plurality of antennas 122A-I may receive a cellular signal having a high signal strength from the mobile device 129A, but antennas 122B, 122F, and 122A also may receive the cellular signal from the mobile device 129A that have progressively weaker signal strengths. The array controller 120 receives the mobile device 129A signals from each of respective antennas 122A, 122B, 122C, and 122F, with each received signal having a respective signal strength. Note that the User Z mobile device cellular signals may also be received at antennas 122D-1, but may have such low signal strengths that any contribution to the location determination is considered negligible. Using known triangulation, trilateration and/or other location determining techniques, the array controller 120 processor, when suitably configured, determines the location of mobile device 129A within the indoor venue 105 for the measured parameter (e.g. signal strengths) of the signals received from that device through some number of the antennas, i.e. through antennas 122A-C and 122F in the present example. The location determination results may be stored in a data storage, for example, in a location log, which will be described in more detail below with respect to FIG. 2. A similar process is used to determine the location of mobile device 129B and any other mobile device within the indoor venue 105. In an alternative example, the array controller 120 may forward the received signals to the venue system controller 110, which in that case would be configured to measure signal parameters, such as signal strength, and execute a location determination algorithm to determine a mobile device location. Other signal parameters, such as signal time-of-arrival determinations between each of the antennas in the array of antennas, may be measured at the antennas 122A-I, the array controller 120 or the venue system controller 110 used to determine the location of the mobile device. For example, the signal time-of-arrival from the mobile device to the respective antennas may be measured, and used to determine the mobile device location (e.g. the mobile device is closest to the antennas with lowest time value.

The venue system controller 110 includes a processor, connections to the MME 130, a number of inputs and outputs, and has access to a data storage 112. In an example, the venue system controller 110 processor is configured to execute computer program instructions stored in a data storage. The venue system controller 110 processor is configured to communicate with the array controller 120, the MME 130 and external entities that may request the data maintained by the venue system controller 110.

As the location information for each of the respective mobile devices 129A and 129B is determined, or prior to determining the location information, the identity of the mobile device subscriber is obtained from MME 130 (as described in more detail with reference to FIGS. 2 and 3). As mentioned above, the MME 130 is responsible for authentication of the respective mobile devices 129A and 129B to the network. The MME 130 also maintains data, such as per call measurement data (PCMD)(described in more detail below), that maps the temporary identifier transmitted by the respective mobile devices 129A and 129B that are communicating through the MME 130 to a permanent identifier (e.g. IMSI) of the mobile device. Using permanent identities of the mobile devices 129A and 129B, other databases may be searched to locate or build a profile of the mobile device subscribers (i.e. User Z and X).

The venue system controller 110 may also have access to a layout diagram of the indoor venue 105, which cross-references coordinates in the location data to features within the indoor venue 105. Features within the indoor venue 105 may include the location of an item, such as a television, food product, computer, shovel or other consumer good or staple, a store location, such as a Gap™, a Starbucks™, a movie theater, or the like, a kiosk, a painting, a sculpture or other feature of interest that has a known location within the layout of the indoor venue.

In addition, other sources of data or data analysis services (e.g. a data analytics service) may be available to the system through the other networks/services 135. The location information and other information related to the mobile device, such as the subscriber profiles or third-party user data (e.g. an affinity program profile that uses a mobile device number (MDN)), may be provided to a data analytics service as part of the other networks/services 135 for further analysis. In addition, the determined location information and subscriber profiles may be aggregated to reveal different information, such as trends, than the information obtained from individual subscriber profiles. For example, by combining a number of different subscriber profiles with the results of the cross-referencing location data to the indoor venue layout, an indoor measurement reporting service may be developed using data analytics. The indoor measurement reporting service may provide information related to i) demographics of people entering a venue at any given time; ii) how different segments of the population spend time in the indoor venue (e.g. how much time they spend at the venue, what brands they shop at, what services they consume, which corridors they walk through etc.); and iii) deriving attributes from data gathered at the venue e.g. such as demographics of subscribers that frequent mall A, a typical Starbucks™ patron within indoor venue 105, other brick-and-mortar shops frequented by the mobile device subscriber, such as User X and User Z, and the like.

Furthermore, as mentioned above, the array of antennas 122 may also detect cellular network signals around the exterior periphery of the indoor venue 105. For example, in the case in which the indoor venue is a shopping mall, an arbitrary area of interest (i.e. similar to a geo-fence) related to GPS coordinates of the exterior physical boundaries of the indoor venue may be established, and the venue system controller 110 may determine an entrance of the indoor venue 105 through which a mobile device entered the indoor venue. As a result, the venue system controller 110 may be able to include information in the reporting service information related to a form of geo-fencing around the indoor venue. The obtained data, for example, may correspond to each mall entrance, a store entrance, a food court area, a parking lot, or the like. The data may be further processed to combine insights gathered from indoor venues with data gathered outside of venues to derive more extensive attributes. For example, attributes such as the demographics of people who shop at retailer A, that use route ABC very frequently when moving through the indoor venue 105, and the like. The indoor venue 105 data may also be transmitted to business partners who may create additional correlations using data obtained through their own systems.

The venue system 220 is configurable according to LTE signal timing and frequency protocols to detect cellular communications in respective timeslots (TS) and frequency sub-carriers (FS). For example, the mobile device 129A is assigned a TS (e.g. TS XYZ) and FS (e.g. FS RB1-4) for communicating the cellular network by a mobile management entity (MME). The venue system 220 including venue system controller 110 and array controller 120 processes the detected signals by analyzing signal timing to determine the TS and FS of the detected signal. In addition, signal parameters are measured, such as signal strength, and used to determine the location of the mobile device that generated the detected signal. In other words, the venue system 220 detects via the array controller 120 signals in the TS XYZ and FS RB1-4 output by the mobile device 129A in the indoor venue 105. However, based on only the detection of a signal in the indoor venue 105, the venue system 220 does not know that mobile device 129A generated the detected signal. The venue system 220, at this point, only knows a signal was detected in the timeslot TS XYZ and frequency sub-carrier FS RB1-4. In other words, the mobile device 129A is unidentified, as of yet. The venue system 220 stores the TS (e.g. XYZ) and FS (e.g. RB1-4), and measures the signal strength of the signals received in the TS XYZ and FS RB1-4. Using known location determining techniques (e.g. trilateration based on signal strength), the venue system 220 determines and stores the location of the still unidentified mobile device that generated the signal detected in the TS XYZ and FS RB1-4. The venue system 220 continues to track the locations of the unidentified mobile device within the indoor venue as the unidentified mobile device communicates with the cellular network. To identify the mobile device, the venue system 220 sends a request including the TS XYZ and FS RB1-4 for the mobile device identifier corresponding to the mobile device that is communicating TS XYZ and FS RB1-4 to the MME. The MME use the TS XYZ and FS RB1-4 information in the request, and obtains from a data storage a mobile device identifier, which corresponds to mobile device 129A, for example. As a result, the unidentified mobile device is now identifiable as mobile device 129A. The identifier is returned to the venue system 220. Using this information, the venue system updates the data related to the TS XYZ and the FS RB1-4 to correspond to mobile device 129A. The following description related to FIG. 2 describes the foregoing discussion in more detail.

Figure 2:
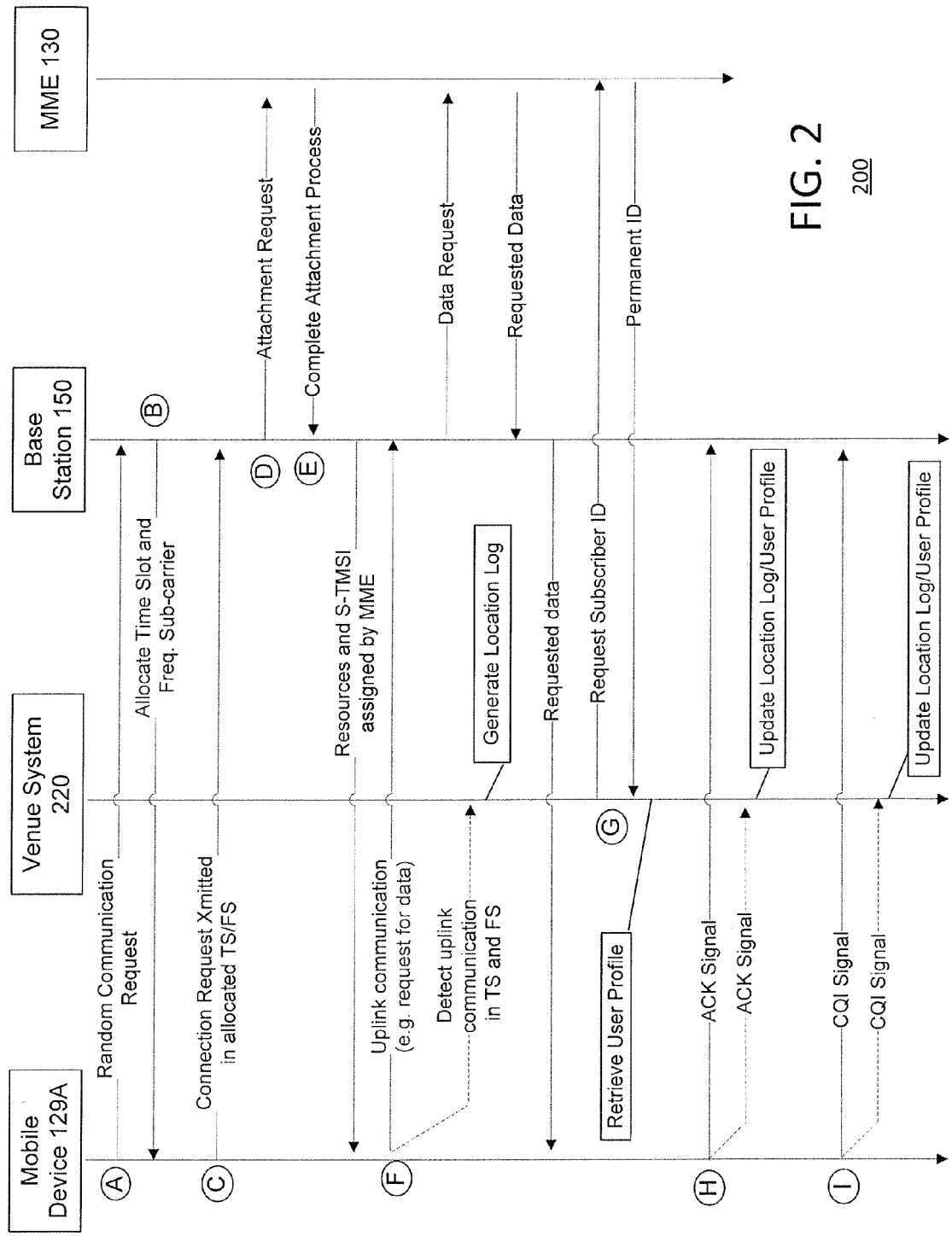
FIG. 2 is a high-level data flow diagram illustrating an example of a signal flow exchange between the components of a network/system like that shown in FIG. 1.
Figure 3:
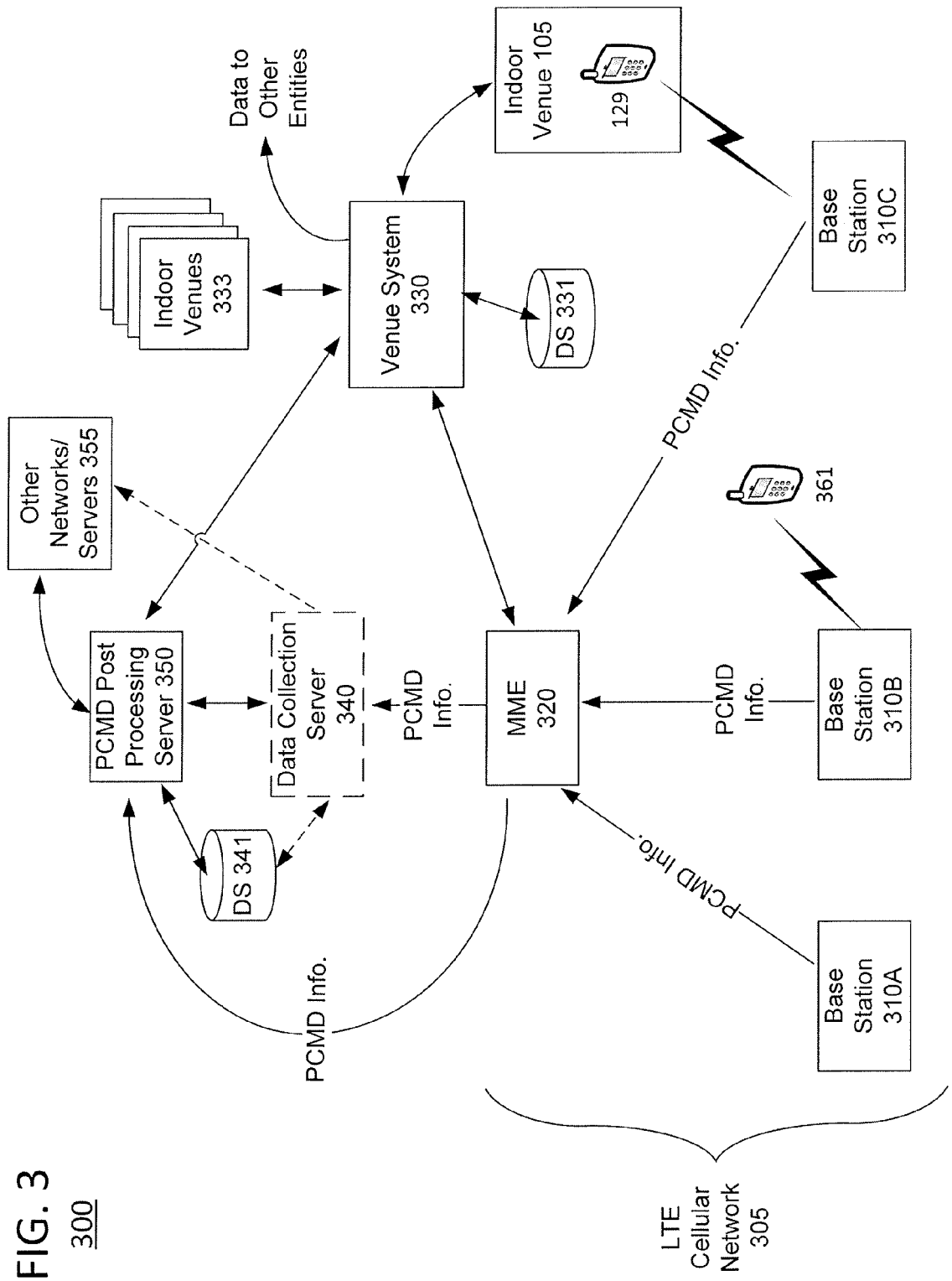
FIG. 3 is a high-level functional block diagram of an example of a network/system implementation including a venue system like that shown in FIG. 1.

FIG. 2 illustrates an example of a cellular message signal flow. The signal flow is between a mobile device 129A inside the indoor venue 105, a base station 150 and a mobile management entity (MME) 130. The illustrated signal flow between the mobile device 129A, and the base station 150 130 may include data, but also includes control signaling involving the MME 130 for establishing and maintaining a communication session between the mobile device 129A and another device (e.g. another mobile device, public switched telephone network terminal or the like) or entity (e.g. website, content service, or the like). The venue system 220 does not participate in the signal flow between mobile device 129A, the base station 150 and the MME 130. The venue system 220 detects and processes signals transmitted by the mobile device 129A, and, from time to time, obtains information related to the detected signals from the MME 130. The venue system 220 includes, for example, the venue system controller 110, the array controller 120, the array of antennas 122A-I, and a data storage 112 of FIG. 1.

For example, a subscriber inside the indoor venue (e.g. User Z) decides to communicate by sending a text message to another subscriber, making a telephone call or requesting a data (e.g. access to a website, a service, digital content and the like) using their mobile device, such as mobile device 129A. To initiate the communication, the User Z mobile device 129A, in response to a user input, transmits a communication request, such as a radio resource connection request, for service according to, for example, the Long Term Evolution (LTE) standard and/or related standards. The request is an arbitrary cellular signal on a separate channel, such a Physical Random Access Channel (PRACH), which is received by the base station 150 (i.e. an eNodeB) (element A). In other words, the mobile device 129A is initiating a request to communicate with the base station 150. In the present example, the signals transmitted between the mobile device 129A and the base station 150 are data packet-based signals, such as those used in LTE cellular communications, but other types of data signals may be used. Other types of communications that may be detected, but not read, by the antennas 122A-I in the array of antennas include requests for backup assistance to cloud storage, such as a DropBox™ request, a mobile application that triggers the use of a web-based service or data service (e.g. YouTube™, Yelp™, or SIRI™-related applications) on the mobile device 129A. In other words, the antennas 122A-I only detect the signals, but do not determine the signal data.

The base station 150 responds with a response message that includes a time slot (TS) and frequency subcarrier (FS) that is available for communication (element B). For example, the base station 150 acknowledges the request, and assigns an uplink resource (i.e. TS and FS) in response to requesting mobile device. The response to the request includes data identifying the allocated TS and FS. The TS and FS are allocated specifically to mobile device 129A. The mobile device 129A initiates a handshaking procedure with the base station 150 by continuing to communicate with the base station 150 now using the assigned TS and FS. In an example, the base station 150 (e.g. an eNodeB) may provide an uplink resource grant via a physical downlink control channel (PDCCH) to the mobile device 129A, and the mobile device 129A may send uplink user data to the base station 150.

Each mobile device requesting communication service from within the indoor venue receives a different TS and FS. For example, mobile device 129A is allocated TS XYZ and FS RB1-4 for communicating with the base station 150, while mobile device 129B is allocated TS ABC and FS RB 6-10 for communicating with the base station 150. Note as each mobile device 129A and 129B attaches through the previously described attachment procedure and detaches (i.e. is no longer active in the cellular network) from the cellular network, a new and different TS and FS may be allocated to the respective devices 129A and 129B. In addition, different TS and FS may be changed frequently for the respective devices 129A and 129B based on the data demands of the respective devices 129A and 129B and the capacity of the network as determined by the base station 150.

For example, the mobile device 129A transmits on the allocated TS and FS (i.e. TS XYZ and FS RB1-4) to the base station 150 to complete the attachment procedure for attaching to the network. During the attachment procedure, the mobile device 129A transmits to the base station 150 a connection request type, or, in other words, a request indicating whether the mobile device 129A wants a voice, data, emergency call, streaming video type of communication (element C). Based on the requested type of communication, the base station 150 can determine the network resources needed to provide the requested communication service. This communication will include one of two identifiers associated with the mobile device depending on the mobile device's network state. If the mobile device 129A has previously been attached to the cellular network (e.g. the mobile device was turned on and in use prior to the mobile device being taken into the indoor venue 105), the communication will include a system architecture evolution (SAE) Temporary Mobile Subscriber Identity (S-TMSI). An S-TMSI is a temporary identifier provided by an MME 130. The S-TMSI is used in place of the permanent identifier of the mobile device (i.e. IMSI) in order to provide some measure of privacy to the mobile device 129A communications. However, if the mobile device 129A is connecting, for example, to the network for a first time from within a cellular network cell location (or a new cell in the cellular network), the mobile device 129A may transmit the actual mobile device permanent identifier, i.e. the IMSI, to attach to the network since the mobile device has yet to be assigned a temporary identifier. The mobile device 129A may be configured to use the S-TMSI whenever it is communicating with a base station 150 unless instructed otherwise by the base station 150. For example, the base station 150 may determine that the mobile device 129A is reaching a location that is close to the boundary of the MME 130 that controls the base station 150, and may instruct the mobile device 129A to begin using its IMSI as the mobile device 129A will need to perform an attachment process with another, different MME.

In an example of the attachment process, the base station 150 forwards an attachment request message to the MME 130 (element D). In response to the attachment request, the MME 130 registers, or updates the status of, the mobile device 129A with the MME 130 (and an HSS (not shown)). The MME 130 may also perform an authentication process that authenticates the mobile device 129A as a mobile device authorized to communicate on the network or not. The authentication result is returned to the base station 150 and forwarded to the mobile device 129A (element D). In response to a successful authentication of the mobile device 129A, the base station 150 allocates the resources (e.g. bandwidth to satisfy the connection request type), and transmits configuration information to the mobile device 129A.

The MME 130 completes the attachment process (Element E), and sends a temporary mobile device ID (S-TMSI) to the base station 150, which forwards the temporary mobile device ID to the mobile device on the allocated TS and FS. The MME 130 has all of the control information related to the communication between the mobile device 129A and the base station 150. The MME 130 may also provide a timestamp related to the communication in each of the TS and FS allocated to the mobile device 129A. In other words, the MME 130 has received from the base station 150 the TS and FS assigned to the mobile device 129A, and has an identifier of the mobile device 129A, either the MME-assigned S-TMSI or the IMSI provided by the mobile device 129A. In general, a number of other identifiers are applied by an MME to the respective mobile devices (e.g. 129A and 129B) as each attaches to the MME. For example, the MME 130 uniquely identifies the mobile device 129A by assigning a 62-bit identifier called the Global Unique Temporary Identifier (GUTI) to the mobile device 129A at attachment. The GUTI is a concatenation of a Globally Unique MME Identifier (GUMMEI) (30-bits) and the MME temporary mobile subscriber identity (M-TMSI) (32-bits). The GUMMEI includes the mobile country code (MCC) (3-bits), the mobile network code (MNC) (3-bits), the MME Group ID (16-bits), and the MME Code (8-bits). The MME 130 provides the M-TMSI to the mobile device 129A. The M-TMSI may be stored in a SIM card, universal integrated circuit card, or some other memory, of the mobile device 129A. For radio communication, the GUTI can be truncated to just the S-TMSI. The S-TMSI is a concatenation of two other identifiers known to the MME 130. The S-TMSI is a 40 bit code formed from an MME Code (an 8 bit code) and a MME Mobile Subscriber Identity (M-TMSI) code (a 32 bit code). The MME Code identifies the MME uniquely within a group, or pool, of MMEs in the servicing mobile network, and the M-TMSI uniquely identifies the mobile device to the particular MME 130. In addition to the above identifiers, the base station 150 (i.e. eNodeB) may be configured to provide temporary identifiers that are coded to identify a location of the mobile device 129A. For example, when the mobile device 129A enters the indoor venue 105, a temporary identifier specific to the indoor venue 105 may be assigned to the mobile device 129A. This allows for simpler data management as the mobile device identifier is based on an identifier specific to the indoor venue. In other words, a single identifier is used for identifying the mobile device and the indoor venue.

For example, while the handshaking procedure is taking place, the venue system 220 is also receiving the cellular signals as it monitors all signals in the cellular band(s). The venue system 220 monitors all cellular communication transmissions in the indoor venue 105 via the array of antennas 122A-1, which provide the received transmissions to the venue system 220. The venue system 220 via the array of antennas 122A-I detects, or receives, all cellular signals including signals on all TS and FS used by the cellular network including the specific TS and FS for each of the mobile devices 129A and 129B currently operating within the indoor venue 105. For example, the venue system 220 begins monitoring the specific TSs and FSs used for cellular communication, such as a mobile communication data signal via the venue system 220 as the mobile device 129A exchanges data with a cellular communication device, such as the MME 150. The venue system 220 may also record a timestamp for each mobile communication data signal detected in the respective TS and FS. In an example, a mobile communication data signal is any cellular mobile device communication (e.g. an uplink communication request), an acknowledgement (ACK) or a negative acknowledgement (NACK) from the mobile device, channel quality indicator (CQI), and the like) transmitted by the mobile device to the base station 150 (i.e. a cellular communication device) and/or the MME 130 (i.e. a cellular network communication management device). The mobile communication data signal has signal parameters, such as signal strength, frequency, amplitude, duration and the like, that may be determined or measured depending upon the configuration of the venue system 220. For example, in a first configuration, the array controller 120 performs the detection and measurement of the signal parameters, and in a second configuration, the controller 110 performs the detection and measurement of the signal parameters. Of course, other configurations of the components of the venue system 220 may also provide the detection and measurement functionality. Using the determined or measured signal parameters, the venue system 220 can determine a location(s), for example, through triangulation, trilateration, and/or multilateration techniques, of the respective mobile devices 129A within the indoor venue 105.

The venue system 220 measures a signal parameter, such as signal strength, of the mobile communication data signal detected by each of the antennas 122A-I in the array of antennas in the respective time slots and frequency sub-carriers. The venue system 220 analyzes the respective signal parameters, such as signal strengths, provided by each of the antennas 122A-I in the antenna array to make a location determination for each of the respective mobile devices 129A and 129B. The output signal power of the respective mobile devices in the indoor venue is set in response to control signals from the base station 150.

The venue system 220 is only monitoring signals of a sufficient parameter value, such as a suitable signal strength, within the indoor venue 105 that are output in the time slot (TS) and frequency sub-carriers (FS) used for cellular transmissions from mobile devices. In other words, signals transmitted to the respective mobile devices will have a lower signal strength than signals transmitted by the respective mobile devices. By rejecting signals of lower signal strength from being analyzed by the venue system 220, potential confusion caused by signals transmitted from outside the indoor venue is minimized. The uplink and downlink signals are in different frequencies in a frequency division duplex system, and, in different time slots in a time division duplex system. For example, the venue system 220 may perform triangulation, extrapolation or trilateration signal processing in real time as signals are received at the respective antennas to determine the position of the mobile device that generated the signal being processed. In another example, if all devices that are determined to be inside the indoor venue are instructed by an MME or base station to transmit at the same power level, the indoor venue antennas 122A-I may be tested, characterized and mapped for signal strength. In which case, the antenna with the highest measured signal strength would be the antenna closest, and a best fit calculation to determine a more precise location may be performed. The venue system 220 is not analyzing any data in the data packets of the signals transmitted by the respective mobile devices in the indoor venue 105. As a result, the venue system 220 does not obtain any of the mobile device identifiers assigned by the MME 130 or transmitted by the respective mobile devices 129A and 129B (e.g. S-TMSI or IMSI), or any other signal data content. The venue system 220 tracks a mobile device based on detecting communications on the TS and FS assigned to the specific mobile device. In other words, the venue system 220 is more concerned with determining the location of the mobile device 129A that generated the signal than the content of the signal.

For example, in a configuration in which the array controller 120, the venue system controller 110, or both, perform the processing of the detected signals, the venue system 220 detects and determines, using location determining techniques, the following information about an unidentified mobile device: transmission timeslot (e.g. TS XYZ), transmission frequency sub-carrier (e.g. FS RB1-4), and a location of the transmission (e.g. location DX). The venue system 220 continues to track the location of the mobile devices (e.g. 129A and 129B) within the indoor venue 105 based on a specific TS/FS that the respective mobile devices are using to communication with the base station 150 and MME 130.

As mentioned above, the venue system 220 receives via the array of antennas all cellular communications generated by mobile devices 129A and 129B from within the indoor venue 105 that are transmitted to the base station 150 and/or the MME 130. In addition to the above described attachment procedure (elements A-E), other mobile device 129A and 129B transmissions are also received.

For example, at element F of FIG. 2, the mobile device 129A generates an uplink communication, such as a request for the download of data, that is transmitted to the base station 150. As used in the present example, an uplink communication is any communication originating from a mobile device to a base station 150. The venue system 220 detects the request for data as an uplink communication in a specific TS and FS.

Returning to the discussion of the uplink communication in element F, the base station 150 forwards the request for data to the server (not shown) offering the data service identified in the request (e.g. identified by the uniform resource locator (URL) in the request). The server obtains the data from, for example, a data storage; and the requested data (e.g. pertaining to a web page) is returned to the base station 150, which forwards the requested data to the requesting mobile device 129A. In an LTE configuration, the requested data is transmitted by the base station 150 to the mobile device, for example, in a physical downlink shared channel while addressing data and the like is performed over a channel called a physical down link control channel. In response to being able to decode the data, the mobile device outputs an acknowledgement (ACK) signal as a mobile communication data signal in the mobile device's time slot and frequency sub-carrier to the base station 150 (element H). However, if the mobile device is unable to decode the data, the mobile device generates a non-acknowledgement (NACK) signal as the mobile communication data signal that is transmitted to the base station 150. The venue system 220 also detects the ACK and NACK signals at the particular TS and FS assigned to the respective mobile device, such as 129A or 129B, for the location processing discussed herein.

The venue system 220 depending on a configuration may send a request including the TS and FS of the detected communication to the MME 130 to confirm the mobile device subscriber permanent identifier that is assigned to the TS and FS of the detected signal. This request insures that the mobile device was not reassigned to a different TS and FS since the last communication. Alternatively, the venue system 220, if so configured, may update a subscriber profile associated with the detected TS and FS with indoor venue location information related to the mobile device.

Element I is another example of a type of mobile device communication detected by the venue system 220 when the mobile device participates in a download data transmission procedure. In this example, the base station 150 inserts a reference signal on a substantially regular basis for the mobile device to perform a channel quality indicator (CQI) estimation. The CQI contains information sent from a mobile device 129A to the base station 150 (i.e. eNodeB) to indicate a suitable downlink transmission data rate for the mobile device 129A to receive data. In response, the mobile device 129A transmits a signal in the TS and FS assigned to the mobile device containing the CQI on a fairly regular basis to the base station 150 (element I). The venue system 220 detects the mobile device's transmitted response signal in the assigned TS and FS, measures the response signal strength from the respective antennas, and determines the location of the mobile device at the time of the transmission. As a result, the venue system 220 can used the CQI response signal as another detectable output signal from the mobile device 129A.

In an example, after each type of mobile device cellular communication shown in elements H and I, the subscriber profile associated with respective mobile device, such as mobile device 129A, is updated using the approximate location information from the location log. The updated subscriber profile may be stored in data storage by the venue system 220.

Another example of a cellular mobile device communication (not shown) that is monitored by the venue system 220 is an uplink data transmission, which is different from the uplink communication of element F. The uplink data transmission is the transmission of data (e.g. photos, video, documents and the like) from the mobile device to the network. In the uplink data transmission, the mobile device inserts into the data packet sounding reference signal (SRS) bits that the base station 150 interprets as a request for the base station 150 to perform a channel quality indicator (CQI) measurement. The SRS signal is a request transmitted in an assigned TS and FS by the mobile device to the base station 150 to perform a channel quality check of the available communication channels. Since the SRS signal is transmitted in a TS and FS by a mobile device, the SRS signal is also detectable by the venue system 220. In addition, the mobile device 129A may also send a scheduling request to obtain network resources for performing the uplink communication (e.g. upload of data). In response, the base station 150 obtains uplink resources based on the results of the channel quality check of the available communication channels. The uplink resources, such as another time slot and frequency sub-carrier information, are selected from the available communication channels from the MME 130 for the respective mobile device to perform the upload. The base station 150 sends to the mobile device a scheduling grant message that includes information related to the uplink resources, such as a time slot and a frequency subcarrier obtained from the MME 130 at which the uplink can be performed. For example, the time slot and frequency sub-carrier information may be changed to a different time slot and frequency sub-carrier subsequent to the initial assignment based on the uplink resources based on the request.

As outlined in the discussion of FIG. 2, the venue system 220 determines the location of the mobile device transmitting at the specific TS and FS, and a time of the communication in response to various uplink transmissions from the mobile device (e.g. in response to elements F, H or I). A processor in the venue system 220 may access a data storage to determine if a location log has been assigned to the particular TS/FS for a mobile device within the approximate time of the communication. The same mobile device may have transmitted on a number of different TS and FS while inside the indoor venue 105. Each of the transmissions in the different TS and FS includes a timestamp that allows the venue system 220 to determine the exact mobile device that communicated on the different TS and FS at the particular time. For example, using information obtained from the MME 130, the venue system 220 can determine the mobile device 129A transmitted on TS XXX, FS xxx at time 13:00, and on TS YYY, FS mmm at time 13:05. If a location log does not exist for the mobile device, a location log is generated as a data record in a data storage, as shown by way of examples as a result of element F.

The location log may be arranged based on the specific TS and FS detected by the venue system 220, and include the locations of devices that transmitted on the specific TS and FS. For example, the location for the mobile device 129A communication on TS XXX, FS xxx at time 13:00, was at coordinates corresponding to Macy's®, and the location of the communication on TS YYY, FS mmm at time 13:05 was from Starbucks® within indoor venue 105. In an example, the location log contains a plurality of data entries indicating approximate locations within the indoor venue from which the mobile device outputted a signal in the time slot and sub-carrier frequency to the cellular network. For example, the location log may be in the form of a table having columns for time slots, frequency, location coordinates, a signal parameter at each antenna in the array of antennas, a time of the communication, one or more coordinates (e.g. latitude-longitude-altitude, XYZ, or numerical grid coordinates), indoor venue specific coordinates, subscriber identifier, and the like. The rows of the table may, for example, include the specific time slot (TS), the specific frequency subcarrier (FS), signal strength, a communication time value, the coordinates of the locations within the indoor venue from which the respective mobile device outputted a cellular communication signal, the IMSI number and the like. In addition, the location log may include information related to an approximate time indication of how long a respective mobile device spent at the determined approximate location.

In addition, the venue system 220 may transmit a request to the MME 130 for a mobile device subscriber identification and/or other information, such as subscriber profile information. The request does not have to occur at the time or in the order shown in FIG. 2, but may be made as soon as a cellular communication from the mobile device is detected, concurrently with the occurrence of an uplink communication, after every cellular communication, upon entry into the venue, or at some other suitable time. The request may include an indication of the TSs and FSs (and times of communications) in which communications have been detected. At times, the time slot (TS) and frequency sub-carrier (FS) assigned to a mobile device may be changed, for example, in order to prevent eavesdropping, as the amount of data to be transmitted and received by the mobile device, or if the mobile device has not attempted to communicate for some time. For example, the TS and FS may change (frequently) in response to the base station 150 (i.e. eNodeB) determining that the amount of data to be delivered to, or transmitted by, the mobile device needs more or less network resources. However, the MME 130, or another device accessible by the MME 130, maintains the TS and FS assignments with respect to a time of the communication. The inclusion of a time of communication parameter in the request data allows the MME 130 to confirm that the provided TS and FS, although unlikely, was not reassigned to a different mobile device. Using the information in the request, the MME 130 can access data to obtain a permanent identifier of the mobile device transmitting in the TS and FS included in the request. In response to the request, the MME 130 returns to the venue system 220 the permanent identifier of a mobile device that has been communicating in the TS and FS (and times) included in the request (element G). The location log may be updated by the venue system 220 to include the permanent mobile device subscriber identifier.

As cellular communication signals, such as the above described mobile communication data signals, are received by the venue system 220 via the array of antennas at new and different time slots and frequency sub-carriers, the location log, or a portion thereof, associated with each of the respective mobile devices transmitting in the indoor venue is populated with the different data as described above. Once populated, the information in the location log is processed, for example, for incorporation into a subscriber profile associated with the mobile device.

The processing of the location log information may be performed by various entities and/or components in network. FIG. 3 is a high-level functional block diagram of an example of a network/system implementation including a venue system like that shown or described with respect in FIGS. 1 and 2. The network/system implementation example 300 may include a LTE cellular network 305, a per call measurement data processing server 350, a data collection server 340, a venue system 330 and one or more indoor venues 105 and 333. The LTE cellular network 305 includes at least a mobility management entity (MME) 320, one or more base stations 310A-C, and at least one mobile device 361. Each of indoor venues 105 and 333 have an installed array of antennas as shown in FIG. 1. Any mobile communication data signals received by the array of antennas in the indoor venues 333 or indoor venue 105, for example, from mobile device 129 inside indoor venue 105 are forwarded to the venue system 330. Alternatively, if the individual antennas in the array of antennas configured to measure signal parameters of the detected signals, the array controller 120 may collect and forward the measured signal parameters to a controller for further processing. In another alternative, the detected signals may be forwarded to the array controller 120 for signal parameter measurement, and subsequent location determination processing.

The MME 320 of the LTE cellular network 305, in addition to being coupled to the base stations 310A-C, is coupled to the venue system 330 and a Per Call Measurement Data (PCMD) post processing server 350. The MME 320 may also be connected to a data collection server 340 that collects PCMD-related information, such as subscriber and/or mobile device identifiers from the MME 320 data storage 321. The PCMD post processing server 350 may obtain or receive data from other resources, such as affinity reward services, advertising services, credit card companies and the like. PCMD-related information is collected periodically by the MME 320 for each mobile device, such as mobile devices 361 and 129, that is managed by the MME 320. PCMD information may include, if available, subscriber information, identifiers associated with the mobile device(s) involved in the communication, and the service type (e.g. voice, short message service (SMS) or data), a number dialed, if any, signal quality, cell information, a requested server address, timing formation and the like. The PCMD information as will be described in more detail below includes information that allows the venue system 330 to determine the permanent identity of the mobile device. The MME 320 may include the components as described with respect to MME 130 of FIG. 1. The MME 320 may be configured in a similar manner as the MME 130 as well as being configured to communicate with and provide the data requested by the venue system 330, the PCMD post processing server 350, or data collection server 340. In addition to providing PCMD information to the venue system 330, the PCMD post processor server 350 may provide PCMD information and related information to other Networks/Servers 355 through wired or wireless connections. The PCMD post processor server 350 is also coupled to the venue system 330. The venue system 330 may store data, such as the location log or subscriber profile information in data storage 331.

The venue system 330 may have various configurations. In an example configuration, the venue system 330 includes a processor and a cellular communication transceiver, a data storage, and one or more antennas. In other configurations, the venue system 330 may be implemented as a component of the MME 320, a component of the PCMD post processing server 350, or as a stand-alone system. As a stand-alone system, for example, the venue system 330 may be located in proximity to one or more of indoor venues 105 and 333. In an example of the operational capabilities of the venue system 330, a processor of the venue system 330 performs the functions of receiving mobile device signals detected by the antenna array, or collected by an array controller, located in the respective indoor venues 333 and determining mobile device locations as well as the functions described above with respect to FIG. 2.

In operation, the LTE cellular network 305 including the MME 320 and the base stations 310A-C perform known functions to provide LTE service to mobile devices, such as mobile devices 361 and 129. Each of the base stations 310A-C, when configured to do so, may provide some information to the MME 320 related to each communication between the respective mobile devices 361 or 129 and a respective base station 310A or 310C. The Per Call Measurement Data (PCMD) information provided to the MME 320 may be aggregated in the MME 320.

As discussed above, the mobile device identifiers in the PCMD information associated with a mobile device, such as mobile device 129, communicating through a base station, such as base station 310C, are of particular interest. The PCMD information includes both the mobile device temporary identifier (i.e. S-TMSI) and the mobile device permanent identifier (i.e. IMSI). The PCMD data records contain data fields that include the MME Mobile Subscriber Identity (i.e. M-TMSI) assigned by the MME 320 to the mobile device 129, and the corresponding temporary identifier S-TMSI of the mobile device 129. As a result, the mobile device temporary identifier (i.e. S-TMSI) can be cross-referenced to the mobile device permanent identifier (i.e. IMSI), or vice versa, by accessing or obtaining the PCMD from the MME 320.

The processing of the location log information (including updating) and the respective subscriber profile information may be performed by one or more of the venue system 330, the MME 320, PCMD post processing server 350, a subscriber profile server, such as one of the other networks/servers 355, or a combination thereof.

In an example, the venue system 330 sends a request for a mobile device permanent identifier information to the MME 320. The request includes information related to a time slot (TS) and a frequency sub-carrier (FS) on which communications by a mobile device were detected by the array of antennas (e.g. 122A-1). The request may also include information related to a particular base station, such as base station 150, and other information. The MME 320 may be configured to respond to the venue system 330 request by providing only the respective mobile device permanent identifier information, or may be configured to provide a batch of PCMD related to a number of mobile devices, such as all that use the base station 150, all of the mobile devices in the indoor venue, or all of the PCMD for the requested TS and FS. In other words, the processing of the batch data or respective mobile device permanent identifier in the PCMD may be performed by the venue system 330. In an alternative, a different server, such as the PCMD post processing server 350, may perform the data processing related to the PCMD information.

Regardless of whether the MME 320, the venue system 330 or the PCMD post processing server 350 performs the processing (e.g. cross-referencing), the PCMD information is processed by cross-referencing the time slot and frequency sub-carrier to the mobile device permanent identifier. In a general example, the cross referencing first entails determining the SAE temporary mobile subscriber identity (S-TMSI) that is assigned to the TS and FS in the PCMD information. The S-TMSI is parsed to remove an MME code, as mentioned above, which leaves the MME mobile subscriber identity (M-TMSI). The PCMD information includes data fields that show the correspondence of the assigned M-TMSI to the IMSI (i.e. permanent identifier) of the mobile device 129. By cross-referencing the M-TMSI data field to the IMSI data field, the permanent identifier of the mobile device 129 is obtained. The permanent mobile device identifier may be transmitted by one or more of the processing device (e.g. the MME 320 or the PCMD post processing server 350) over the cellular network communication channels or via a separate venue specific communication path, such as a wired connection or other dedicated communication path with the processing device, to the venue system 330.

Using the permanent identifier obtained by the above process, for example, the venue system 330 retrieves a subscriber profile associated with the permanent identifier related to the at least one mobile device 129 from a data storage, such as DS 331 or from DS 341.

The subscriber profile includes anonymized information related to different aspects of a mobile device subscriber. The subscriber profile may be a collection of data related to the subscriber collected from one or more sources of data, such as the other networks/servers 355. The subscriber profile may include, for example, demographic information, such as age, estimated income bracket, marital status, residence zip code; common routes taken during the day; credit card information, frequent travel destinations, frequently visited retailers, stores and other venues, affinity programs (e.g. retailer or credit card rewards programs; and the like). The information may be obtained through agreements made with the respective retailers, business partners, vendors or service providers that manage or own the data from the affinity programs, retailer or credit card rewards programs, or the like. In addition, the location information may also be shared under agreements with similar programs and/or business partners associated with the indoor venue location system.

The location information provided by the venue system 330 may relate to features within the indoor venue, such as vendors, retailers, restaurants, kiosks, advertising displays, exhibits, specific product locations, and the like. For example, a management company associated with the indoor venue 105 may have building plans that identify the locations of the each of the elements, such as retailer store locations, kiosks, social areas (e.g. "tot lots", sitting areas and the like), restaurants, art exhibits, and other features of the indoor venue. The plans may be in electronic form (using known layout software tools, such as Microsoft® Visio) and the general GPS locations of the indoor venue structural features, such as corners, doorways and other areas, may be determined and associated with the electronic plans. The GPS locations of the interior elements, described above, may also be determined and included in the electronic file. From the electronic file, a layout map of each of the respective indoor venues 105 and 333 may be generated. The venue system 330 has access to a layout map of the indoor venues 105 and 333. As an example, the indoor venue 105 layout map may include a relative position of features within the indoor venue that overlays a coordinate system related to the coordinates of the approximate locations determined by the venue system 220 for the at least one mobile device inside the indoor venue-specific coordinate system. The features in the layout map may be, for example, a location of a kiosk or store front in a shopping mall, a department (e.g. shoes, juniors, men's, women's and the like) location in a department store (which may also be in the shopping mall or in a stand-alone building), an item in an aisle of a store (e.g. a grocery item, such as a can of corn, a television set, or the like), a beverage or food service in a stadium or concert hall, a painting in an art gallery, a car in an automotive show, or a specific location in a tradeshow, and the like. In an additional example, the venue system 220 is configured to compare the identified mobile device coordinates to the coordinates in the indoor venue layout map, and determine based on the comparison, a specific position of the mobile device within the indoor venue. Once the specific location is known via a place name, such as Macy's™, Starbucks™, corn, or shoes, the location log may be updated to include the place name, instead of undecipherable coordinates. The use of place name information provides another level of specificity to the location data in a human-readable context, and provides additional opportunities to perform data mining analysis.

In another example, the antennas 122A-I in the array of antennas may be configured to detect signals output by a mobile device at the exterior of the indoor venue 105. The antennas 122A-I may receive mobile device signals that are output within a few hundred feet, such as 500 feet, of the exterior boundary of the indoor venue 105. In this case, the venue system 330 is configured to determine the location of the mobile device prior to the user or subscriber entering the indoor venue. Using information related to the mobile device location at the exterior of the indoor venue, the venue system 330 can infer additional information from the location information with respect to user.

The indoor venue location data collection described in the above examples is advantageous in that it does not require a user to access a special application or have additional location-services settings on the user's mobile device set obtain the benefits of the location services. Location information related to a mobile device within an indoor venue may be collected when a mobile device, such as an LTE-enabled mobile device, is powered "ON." It is envisioned that the disclosed system may collaborate with other systems and services to provide notifications (or other types of alerts or coupons) to the mobile device and other parties. For example, retailers in the indoor venue 105 may subscribe to a service provided through the venue system 330. The service may be based on some of the information provided by the venue system 330. The service may generate a notification (e.g. a short messaging service (SMS) message) to the retailer when a particular subscriber, who, based on past actions, frequently visits the retailer, has entered the indoor venue 105. Of course, a subscriber may be given a choice to opt-into or opt-out of inclusion in such service.

In other examples, a subscriber, upon being identified by the venue system 330, may receive an SMS message or other notification (e.g. e-mail or telephone call) related to events or special sales occurring at the indoor venue 105 at that time or in the future. Or, the venue system 330 may notify an event coordinator that the subscriber is present in the indoor venue and reservation of a spot in a queue for receipt of a service or a reservation related to an event (e.g. movie ticket, table reservation at a restaurant, product reservation (e.g. for the latest smartphone) or the like) should be made for the subscriber. Again, a subscriber may be given a choice to opt-into or opt-out of inclusion in such a notification or reservation service.

The exemplary services that may be provided by the venue system 330 do not require a mobile device to execute an application specific to the service, but merely be capable of receiving an SMS message or e-mail message. Of course, a particular application specific to a service may use the information provided by the venue system 330 to provide more personalized and specific services to the subscriber. For example, a retailer specific application may provide inventory related information to the subscriber based on the subscriber's past purchase history.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the indoor venue location determination and subscriber profile updating. The software code is executable by the general-purpose computer that functions as the venue system and/or that functions as a venue system terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for indoor venue location determination and subscriber profile updating, in essentially the manner performed in the implementations discussed and illustrated herein.

Figure 5:
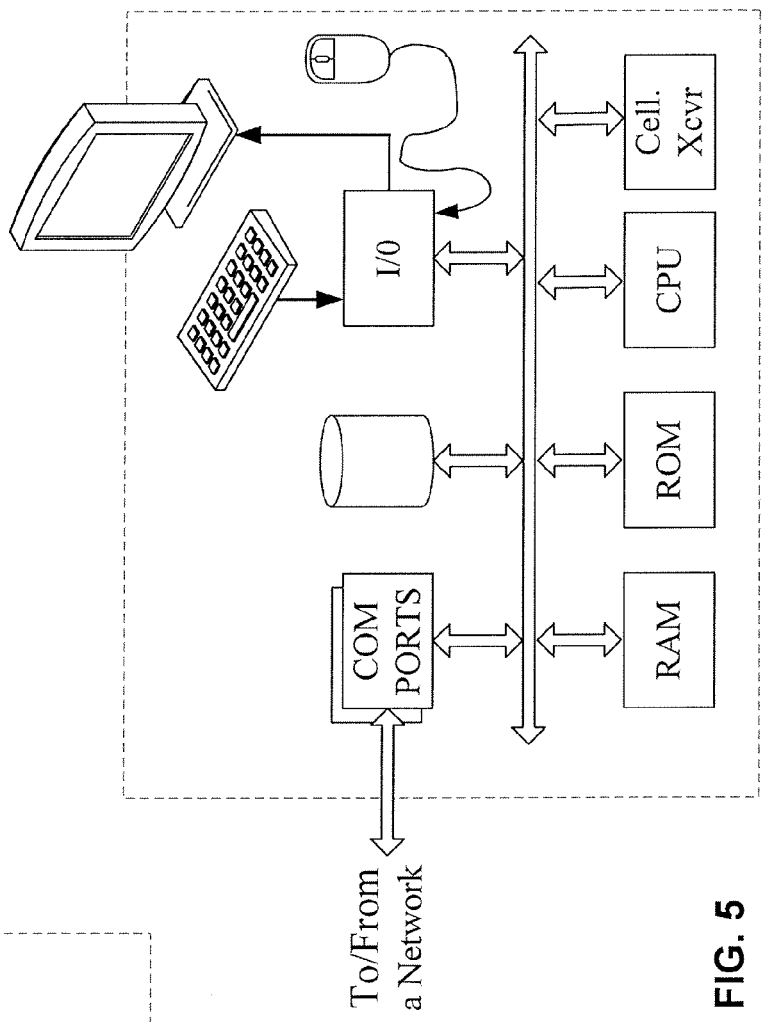
FIG. 5 is a simplified functional block diagram of a computer that may be configured as a user terminal.
Figure 4:
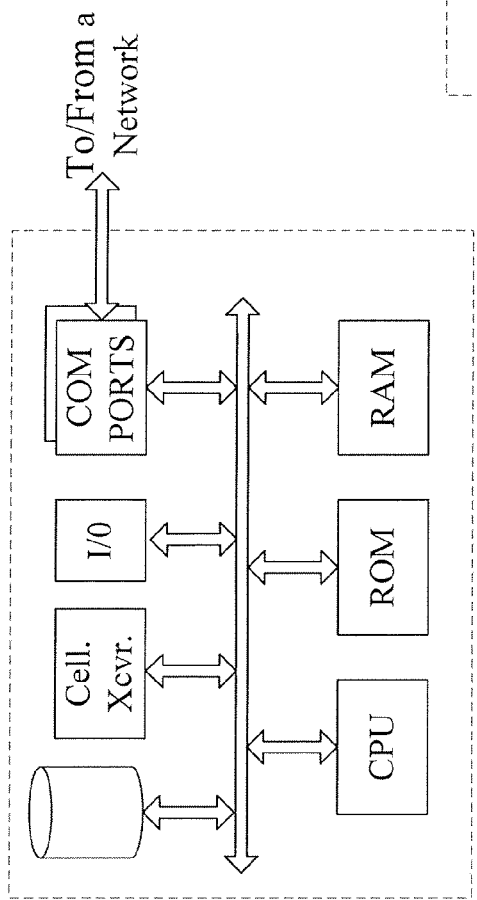
FIG. 4 is a simplified functional block diagram of a computer that may be configured as a host or server.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server or controller, for example, includes a data communication interface for packet data communication. The server, or controller, also includes a central processing unit (CPU), in the form of one or more processors, for executing program instructions. The server platform typically includes an internal communication bus, program storage and data storage for various data files to be processed and/or communicated by the server, although the server often receives programming and data via network communications. In addition, to the communication ports for exchanging communications with a network, the server or controller may be equipped with a cellular communications transceiver to communicate with devices, such as a base station (e.g. eNodeB) or a cellular management entity (e.g. MME). The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods and examples of indoor venue location determination and subscriber profile updating outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of cellular service provider into the computer platform of the indoor venue location determination and that will be the venue system controller/server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the examples, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

What is claimed is:

1. A method, comprising:
    detecting, by a plurality of antennas within an indoor venue, a mobile communication data signal transmitted by a mobile device;
    identifying a time slot and frequency sub-carrier associated with the detected mobile communication data signal;
    measuring a signal parameter of the mobile communication data signal detected by each of the plurality of antennas in the time slot and frequency sub-carrier;
    determining, using the signal parameter measured by each of the plurality of antennas, information identifying an approximate location of the mobile device inside the indoor venue;
    determining, using the time slot and frequency sub-carrier, an identity associated with the mobile device; and
    storing the information identifying the approximate location of to the mobile device and the time slot in a location log associated with the mobile device.

2. The method of claim 1, further comprising:
    retrieving from a data storage a subscriber profile associated with the mobile device;
    obtaining, from the location log, the information identifying the approximate location of the mobile device; and updating the subscriber profile using the information identifying the approximate location of the mobile device.

3. The method of claim 1, wherein the mobile communication data signal is a radio resource connection request transmitted in the time slot via the frequency sub-carrier and contains a temporary identifier assigned to the mobile device.

4. The method of claim 1, wherein the mobile communication data signal is an acknowledgement signal indicating that the mobile device has decoded data transmitted to the mobile device.

5. The method of claim 1, wherein the mobile communication data signal is a negative acknowledgement signal indicating that the mobile device is unable to decode data transmitted to the mobile device.

6. The method of claim 1, wherein the mobile communication data signal is any communication transmitted by the mobile device to a cellular communication management device.

7. The method of claim 1, further comprising:
requesting, via a venue specific communication path with a cellular communication management device in a cellular network, data including a permanent mobile device identifier corresponding to the time slot and frequency sub-carrier in which the mobile device is communicating;
in response to the request, receiving from the cellular communication management device the permanent identifier of the mobile device;
determining an approximate location of the mobile device within a boundary of the indoor venue whenever the mobile device outputs a mobile communication data signal in the identified time slot and sub-carrier frequency to communicate with the cellular network;
generating a location log entry in the location log based on the determined approximate location of the mobile device; and
outputting at least some location information from the generated location log entry to a mobile device subscriber profile database.

8. The method of claim 1, wherein determining the identity associated with the mobile device further comprises:
receiving, from the mobile device, the mobile communication data signal transmitted at the time slot and on the sub-carrier frequency, wherein the mobile communication data signal is an uplink data packet that includes a temporary mobile device identifier; and
receiving from a cellular communication management device a permanent mobile device identifier that corresponds to the temporary mobile device identifier.

9. The method of claim 8, wherein the mobile communication data signal transmitted by the mobile device in the time slot and on the sub-carrier frequency is an acknowledgement signal transmitted in response to a data signal transmitted in a physical downlink shared channel.

10. The method of claim 1, wherein the location log contains a plurality of data entries indicating approximate locations within the indoor venue from which the mobile device outputted a signal in the time slot and sub-carrier frequency to a cellular network.

11. The method of claim 1, wherein determining the information identifying the approximate location of the mobile device inside the indoor venue comprises:
receiving the mobile communication data signal transmitted from the mobile device by at least two antennas located within an interior of the indoor venue; and
based on the signal parameter of the received signal at each of the at least two antennas and a known position of each of the at least two antennas, determining coordinates of the approximate location of the mobile device within the indoor venue.

12. The method of claim 11, wherein the signal parameter is signal strength.

13. The method of claim 1, further comprising:
generating a location log entry for the mobile device using the identified time slot and frequency sub-carrier as a reference to the mobile device, wherein storing the information identifying the approximate location of the mobile device includes storing coordinates of the approximate location in the location log entry.

14. The method of claim 1, further comprising:
in response to receiving the mobile communication data signal, determining an indication of an approximate amount of time that the mobile device spent at the determined approximate location.

15. The method of claim 1, further comprising:
identifying coordinates of the mobile device in a coordinate system specific to the indoor venue;
comparing the identified coordinates of the mobile device to a layout map of the indoor venue, wherein the layout map includes a relative position of features within the indoor venue overlaying the indoor venue-specific coordinate system; and
based on the comparison, determining a specific position within the indoor venue of the mobile device.

16. A system, comprising:
a controller including a processor and cellular communication transceiver;
a data storage device coupled to the controller, and
a plurality of antennas located indoors at an indoor venue, wherein each of the plurality of antennas is communicatively coupled to the controller via the cellular communication transceiver,
wherein the processor is configured to:
receive, at a specific time slot and frequency sub-carrier in a cellular communication protocol, a cellular signal from a mobile device at the plurality of antennas within the indoor venue;
determine, using the specific time slot and frequency sub-carrier, an identity associated with the mobile device;
retrieve a subscriber profile associated with the mobile device;
in response to retrieving the subscriber profile, identify, using an indoor venue-specific coordinate system, coordinates of the mobile device in the indoor venue using a cellular signal strength relative to each of the respective plurality of antennas that received the cellular signal;
compare the identified mobile device coordinates to a layout map of the indoor venue, wherein the layout map includes a schematic layout diagram of elements within the indoor venue overlaying the indoor venue-specific coordinate system; and
based on the comparison, determine a specific location within the indoor venue corresponding to the identified coordinates of the mobile device.

17. The system of claim 16, wherein the processor is further configured to:
modify the subscriber profile using the determined specific location of the mobile device within the indoor venue.

18. The system of claim 16, wherein the processor is further configured to:

in response to receiving the cellular signal, determine an approximate amount of time that the mobile device spent at the determined specific location.

19. The system of claim 16, wherein the processor is further configured to:

at a subsequent time, receive, at a different time slot and frequency sub-carrier in a cellular communication protocol, another cellular signal from the mobile device at the plurality of antennas within the indoor venue, wherein the different time slot and frequency sub-carrier were assigned to the mobile device for transmitting the other cellular signal;

in response to receiving the other cellular signal in the different time slot and frequency sub-carrier, identify second coordinates of the mobile device in the venue-specific coordinate system;

compare the identified mobile device second coordinates to the layout map of the indoor venue, wherein the layout map includes a relative position of features within the indoor venue overlaying the indoor venue-specific coordinate system; and based on the comparison of the second mobile device second coordinates to the layout map, determine a subsequent specific location within the indoor venue of the mobile device when the mobile device transmitted the other cellular signal.

20. The system of claim 19, wherein the processor is further configured to:

determine that the specific location and the subsequent specific location both correspond to the mobile device; and update a subscriber profile related to the mobile device with the specific location and the subsequent specific location.

* * * * *